United States Patent
Lopez Pielago et al.

(10) Patent No.: US 10,625,993 B2
(45) Date of Patent: Apr. 21, 2020

(54) CRANE OF A WIND TURBINE

(71) Applicant: GAMESA INNOVATION & TECHNOLOGY, S.L., Sarriguren (Navarra) (ES)

(72) Inventors: Borja Lopez Pielago, Sarriguren (ES); Israel Alonso Bravo, Madrid (ES)

( * ) Notice: Subject to any disclaimer, the term of this patent is extended or adjusted under 35 U.S.C. 154(b) by 57 days.

(21) Appl. No.: 15/790,532

(22) Filed: Oct. 23, 2017

(65) Prior Publication Data
US 2018/0111805 A1    Apr. 26, 2018

(30) Foreign Application Priority Data
Oct. 24, 2016   (ES) .................................. 201600888

(51) Int. Cl.
| | |
|---|---|
| *B66C 23/18* | (2006.01) |
| *B66C 23/84* | (2006.01) |
| *F03D 13/10* | (2016.01) |
| *B66C 23/20* | (2006.01) |
| *F03D 80/50* | (2016.01) |

(52) U.S. Cl.
CPC .......... *B66C 23/185* (2013.01); *B66C 23/207* (2013.01); *B66C 23/84* (2013.01); *F03D 13/10* (2016.05); *F03D 80/50* (2016.05); *F05B 2230/61* (2013.01); *F05B 2240/916* (2013.01); *Y02E 10/726* (2013.01); *Y02E 10/728* (2013.01); *Y02P 70/523* (2015.11)

(58) Field of Classification Search
CPC ..... B66C 23/185; B66C 23/207; B66C 23/66; B66C 23/84; F03D 13/10; F03D 80/50; F05B 2240/916; Y02E 10/726; Y02P 70/523
See application file for complete search history.

(56) References Cited

U.S. PATENT DOCUMENTS

| | | | | |
|---|---|---|---|---|
| 4,184,600 | A * | 1/1980 | Goss ........................ | B66C 23/84 212/175 |
| 4,354,606 | A * | 10/1982 | Morrow .................. | B66C 23/84 212/175 |
| 4,688,688 | A * | 8/1987 | Volakakis ............... | B66C 23/16 212/223 |
| 5,487,478 | A * | 1/1996 | Morrow .................. | B66C 23/16 212/223 |
| 9,290,362 | B2 * | 3/2016 | Hey ........................ | B66C 13/02 |
| 2007/0200103 | A1 * | 8/2007 | Viladomiu i Guarro ..................... B66C 23/207 254/334 |

(Continued)

FOREIGN PATENT DOCUMENTS

FR          2903739 A1 *   1/2008  .......... B66C 23/207

*Primary Examiner* — Emmanuel M Marcelo
(74) *Attorney, Agent, or Firm* — Ladas & Parry LLP

(57) ABSTRACT

Crane of a wind turbine (200), comprising a fixed part (1), a pivoting part (2) which is attached with rotational freedom to the fixed part (1), a support (3) which is attached to the pivoting part (2), a winch (4), a wiring system between the winch (4) and the support (3), and a guide for guiding the wiring system along its path. The wiring system comprises a single wire (6), and the guide comprises a pulley (52) in the fixed part (1) for guiding it through said fixed part (1), and a pulley (53) in the pivoting part (2) for guiding it through said pivoting part (2). The wire (6) comprises a section (60) between the two pulleys (52, 53), which goes through the center of rotation of the pivoting part (2) with respect to the fixed part (1) connecting both parts (1, 2).

12 Claims, 6 Drawing Sheets

(56) References Cited

U.S. PATENT DOCUMENTS

| | | | |
|---|---|---|---|
| 2010/0253086 A1* | 10/2010 | Song | F03D 13/10 290/55 |
| 2010/0254813 A1* | 10/2010 | Dawson | B66C 23/207 416/146 R |
| 2010/0281819 A1* | 11/2010 | Thompson | E04G 11/22 52/745.17 |
| 2011/0017695 A1* | 1/2011 | Vandenbulcke | B66C 17/06 212/279 |
| 2012/0159875 A1* | 6/2012 | Meyer | E04H 12/182 52/115 |
| 2012/0228881 A1* | 9/2012 | Siegfriedsen | F03D 13/20 290/55 |
| 2014/0102039 A1* | 4/2014 | Wagner | E04H 12/342 52/745.18 |
| 2014/0175038 A1* | 6/2014 | Arlaban Gabeiras | E04H 12/342 212/195 |
| 2015/0044011 A1* | 2/2015 | Matulewicz | B66D 1/60 414/800 |
| 2015/0048043 A1* | 2/2015 | Laurens | B66C 23/207 212/179 |
| 2015/0167342 A1* | 6/2015 | Montaner Fraguet | B66C 23/32 52/745.18 |
| 2015/0219067 A1* | 8/2015 | Clymans | B66C 23/185 29/889.2 |
| 2015/0284218 A1 | 10/2015 | Fenger | |
| 2016/0010623 A1* | 1/2016 | Zuteck | F03D 13/20 52/116 |
| 2017/0067447 A1* | 3/2017 | Reynolds | F03D 13/10 |
| 2018/0282134 A1* | 10/2018 | Lagerweij | B66C 23/185 |

* cited by examiner

CRANE OF A WIND TURBINE

TECHNICAL FIELD

The present invention relates to cranes for wind turbines, and more specifically to cranes for wind turbines that are fixed on the wind turbine itself.

PRIOR ART

The development of new wind-driven power generators (or wind turbines) has resulted in larger and more powerful ones. Large wind turbines allow installing more electric power in one and the same site and reduce the visual impact of a wind farm formed by several wind turbines.

Each wind turbine comprises a fixed tower raised above the ground and a nacelle in the upper part of the tower. The nacelle comprises at least one blade (generally a plurality of blades), and an electric generator housed inside a nacelle cover. The electric generator in turn comprises a stator and rotor to enable generating electric energy from the rotation of the rotor, and the rotor is connected to the blades rotating integrally therewith. The blades are exposed to the wind, such that they are adapted for rotating when pushed by the wind, said rotation being transmitted to the rotor which rotates integrally with said blades, the electric generator thereby generating electric energy. The blades are therefore responsible for converting the kinetic energy of the wind into rotational movement of the rotor, and the rotation of the rotor results in the generation of electric energy. The increase in generated electric power (electric energy) is directly related to the increase in the dimensions of the rotor of the electric generator of the wind turbine and, accordingly, the increase in the length of the blades of the wind turbine.

As mentioned, blades are exposed to the wind and are responsible for converting the kinetic energy of the wind into rotational movement of the rotor (resulting in the generation of electric energy), so it is a critical, if not the most critical, element of the wind turbine. For this reason, blades are elements which are subject to preventive and corrective inspections for which it is usually necessary to disassemble them (disconnecting them from the rotor) and lower them to the ground to subsequently lift and connect them again up to the rotor once the necessary maintenance tasks have been performed on the ground (or wherever deemed appropriate). This can occur with other elements of the nacelle which are generally heavy and bulky, making it necessary to use large cranes to perform these tasks, like what occurs with the blades.

To that end, maintenance operators use large cranes which allow moving large and heavy rotors. Cranes of this type are furthermore very expensive, so the wind farm installation cost or the cost of the maintenance tasks increases significantly due to the use thereof.

Patent document US2015284218A1 discloses a crane arranged in the nacelle of a wind turbine for lifting and lowering heavy elements of the wind turbine. The crane comprises an anchoring support for fixing same to the nacelle, an external winch with wires, arranged close to the base of the tower of the wind turbine, and a hook at one end of an arm of the crane hooking onto the element of the wind turbine to be moved. The winch is connected through a double wire guide to a pulley including the hook, said element therefore being able to be lowered and lifted by means of said crane. The double wire guide is used for guiding two wires to the hook for the purpose of offering greater strength in a safe manner, and it comprises a set of two wheels in a fixed part of the crane and a set of two wheels in the pivoting part of the crane, both sets being arranged such that the contact between the two wires is prevented.

DISCLOSURE OF THE INVENTION

The object of the invention is to provide a crane of a wind turbine for lifting and lowering heavy elements of the wind turbine, as defined in the claims.

The crane of a wind turbine of the invention is adapted to enable lifting and lowering heavy elements of the wind turbine, such as an electric generator, for example. The crane is arranged in the wind turbine to perform said tasks.

The crane comprises a fixed part which is fixed to a part of the wind turbine, a pivoting part which is attached with rotational freedom to the fixed part, a load support for supporting the heavy element to be lowered or lifted, attached to the pivoting part, a winch which is arranged close to the base of the tower of the wind turbine, a wiring system extending between the winch and the load support, and a wiring guide for guiding the wiring system from the winch to the load support through the fixed part and the moving part. The wiring guide therefore comprises a first part attached to the fixed part of the crane, and a second part attached to the pivoting part of said crane.

The wiring system comprises a single wire, and the wiring guide comprises at least one pulley attached to the fixed part of the crane for guiding the single wire through the fixed part of the crane, and at least one pulley in the pivoting part of said crane for guiding said single wire through the pivoting part of the crane.

The single wire comprises a wire section between the pulley of the fixed part and the pulley of the pivoting part, connecting the fixed part of the crane to the pivoting part of said crane. The pulley of the fixed part and the pulley of the pivoting part are furthermore arranged such that said wire section goes through the center of rotation of the pivoting part with respect to the fixed part.

Therefore, as a result of this configuration and of the wire section attaching both parts of the crane (fixed part and pivoting part) being in the described center of rotation in particular, the crane is capable of supporting the stress required for lifting and lowering the corresponding heavy element with the single wire, without requiring an additional wire for that purpose as occurs in the state of the art. The use of a single wire allows reducing the number of pulleys required in the crane, which simplifies its design and maintenance and furthermore reduces its cost, and complications derived from using two wires to enable supporting said heavy element are furthermore prevented.

These and other advantages and features of the invention will become evident in view of the drawings and the detailed description of the invention.

DESCRIPTION OF THE DRAWINGS

FIG. 1b shows another perspective view of the crane of FIG. 1a.

FIG. 3 schematically shows the crane of FIG. 1a.

FIG. 4 schematically shows the crane of FIG. 1a.

DETAILED DISCLOSURE OF THE INVENTION

Figure 1A:
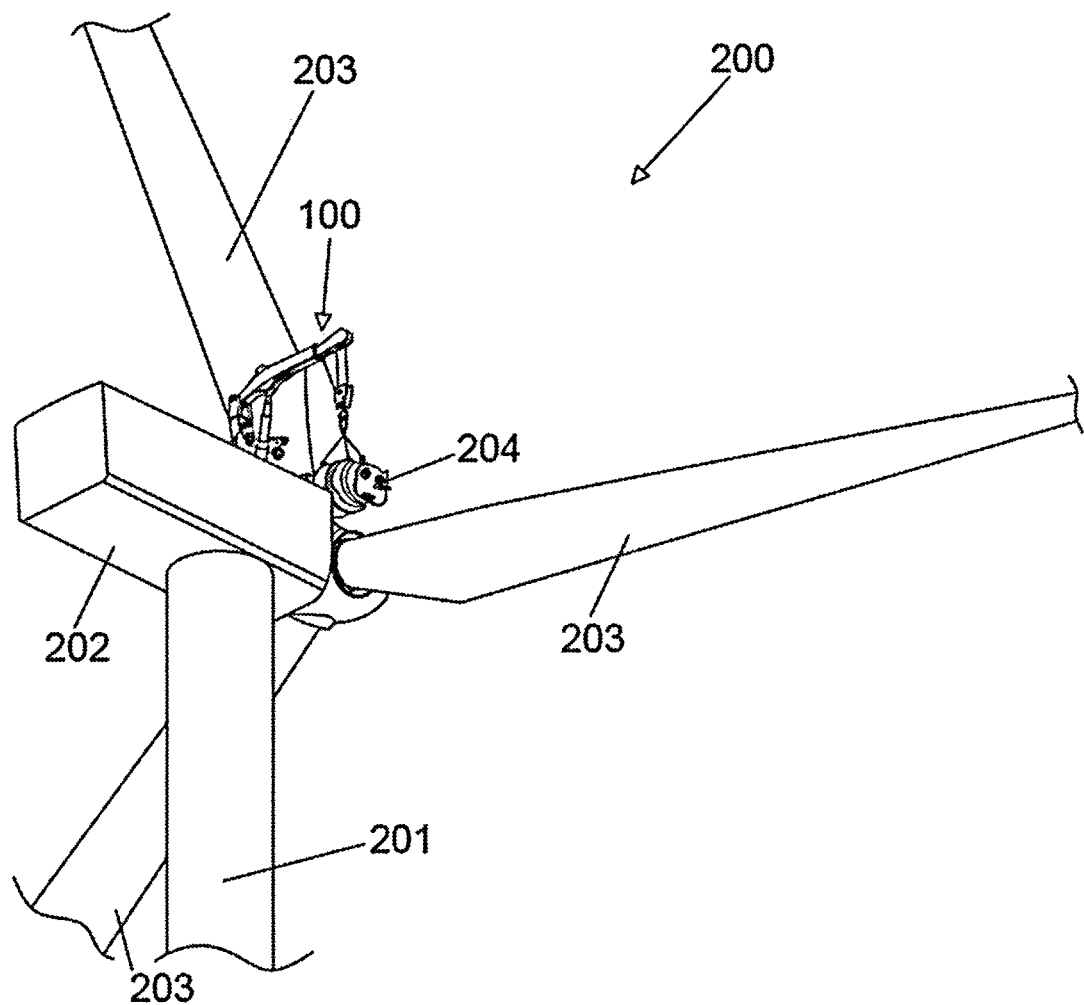
FIG. 1a shows a perspective view of one embodiment of a crane according to the invention, fixed on a wind turbine.
Figure 1B:
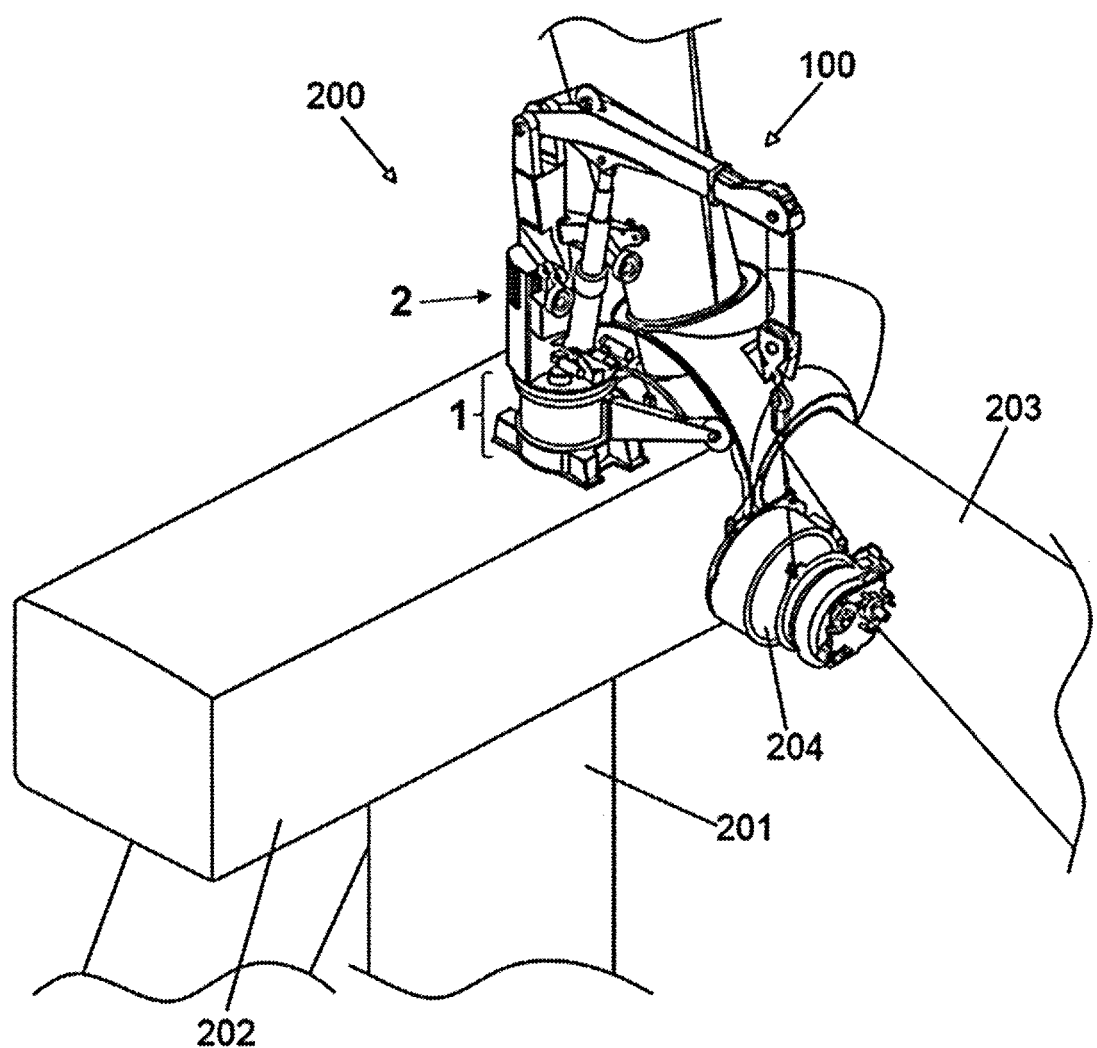
Figure 2:
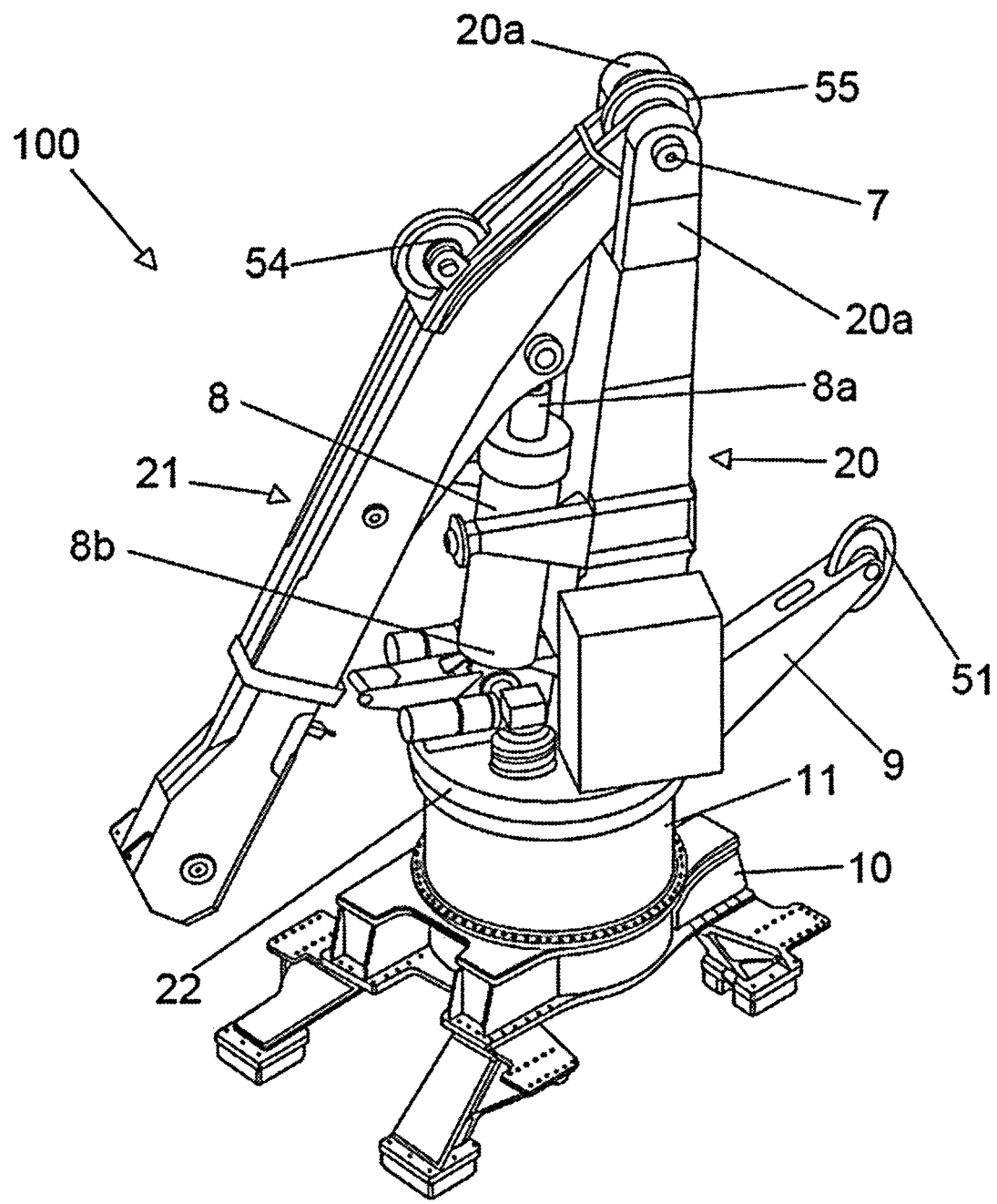
FIG. 2 shows the crane of FIG. 1a, without the winch.

The crane 100 of a wind turbine 200 of the invention is adapted for lifting and lowering heavy elements of said wind turbine 200, such as an electric generator 204, for example. With reference to FIGS. 1a and 1b, the wind turbine 200 comprises a tower 201 fixed to the ground and a nacelle 202 fixed to the upper part of the tower 201, the nacelle 202 comprising an electric generator 204 therein and a plurality of blades 203 in operating conditions.

As shown in Figures, the crane 100 comprises a fixed part 1, a pivoting part 2 which is arranged on arranged on the fixed part 1 and attached with rotational freedom to the fixed part 1, a load support 3 attached to the pivoting part 2 for supporting the heavy element to be lowered or lifted, a winch 4 which is preferably arranged close to the base of the tower 201 of the wind turbine 200, a wiring system between the winch 4 and the load support 3, and a wiring guide for guiding the wiring system from the winch 4 to the load support 3 through the fixed part 1 and the pivoting part 2. The wiring guide comprises a first part attached to the fixed part 1 of the crane 100, and a second part attached to the pivoting part 2 of said crane 100 and which rotates with respect to the fixed part 1 integral with the pivoting part 2.

The wiring system comprises a single wire 6 extending from the winch 4 to the load support 3, passing through the fixed part 1 and the pivoting part 2 of the crane 100. The wiring guide comprises at least one pulley 52 in the first part attached to the fixed part 1 for guiding said single wire 6 through said fixed part 1 of the crane 100, and at least one pulley 53 in the second part attached to the pivoting part 2 for guiding said single wire 6 through said pivoting part 2.

The load support 3 can comprise, for example, a hook for holding the element to be lifted and/or lowered (by means of tow ropes, for example), and the single wire 6 is gradually released from the winch 4 or gradually wound onto the winch 4 as said element is lowered or lifted. This generates a movement of the single wire 6 in one direction or another depending on whether said element is being lowered or lifted. During this movement, the pulleys of the wiring guide can rotate in one or another direction depending on the direction of movement of the single wire 6, with respect to the proper axis thereof.

Figure 3:
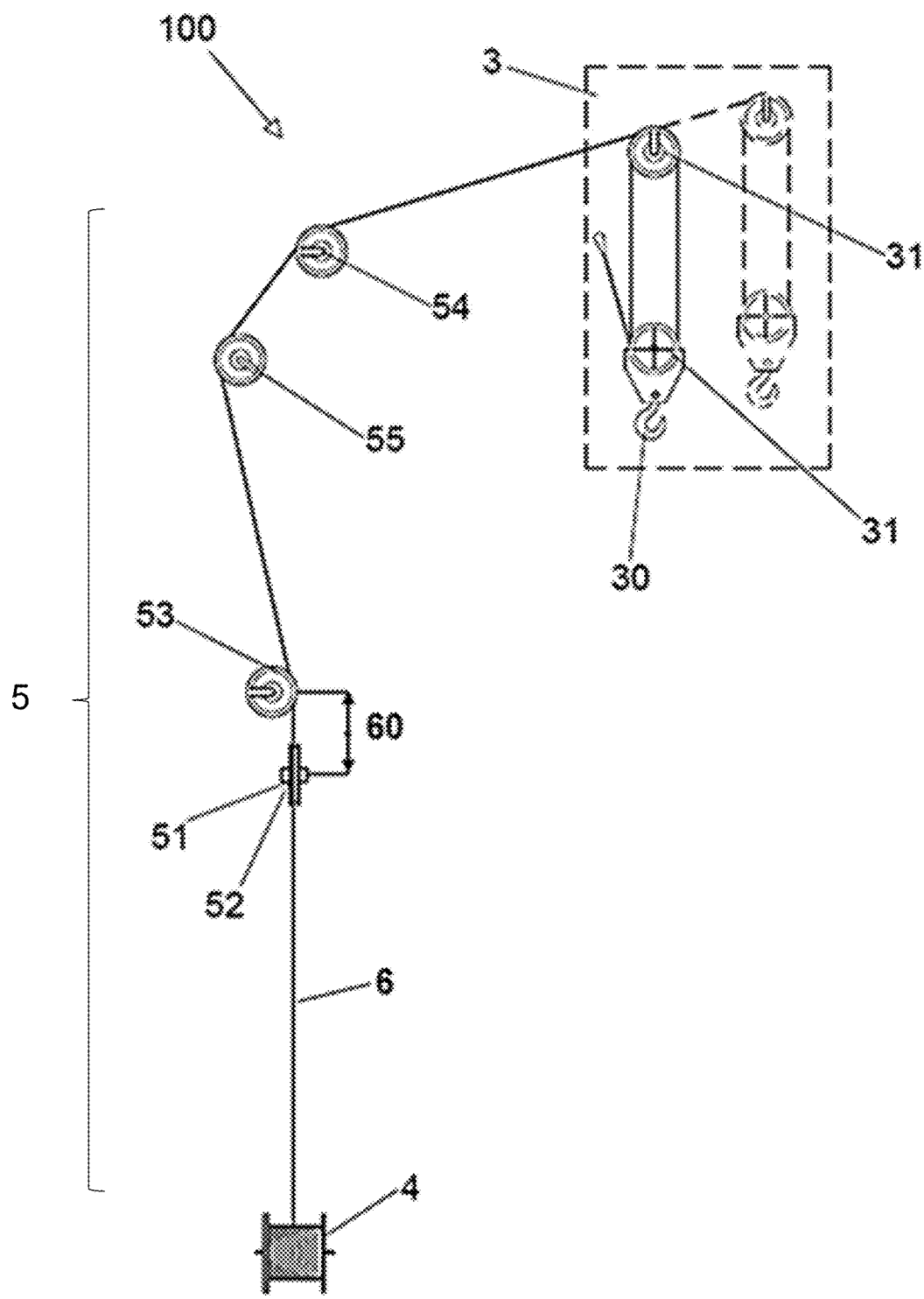
Figure 4:
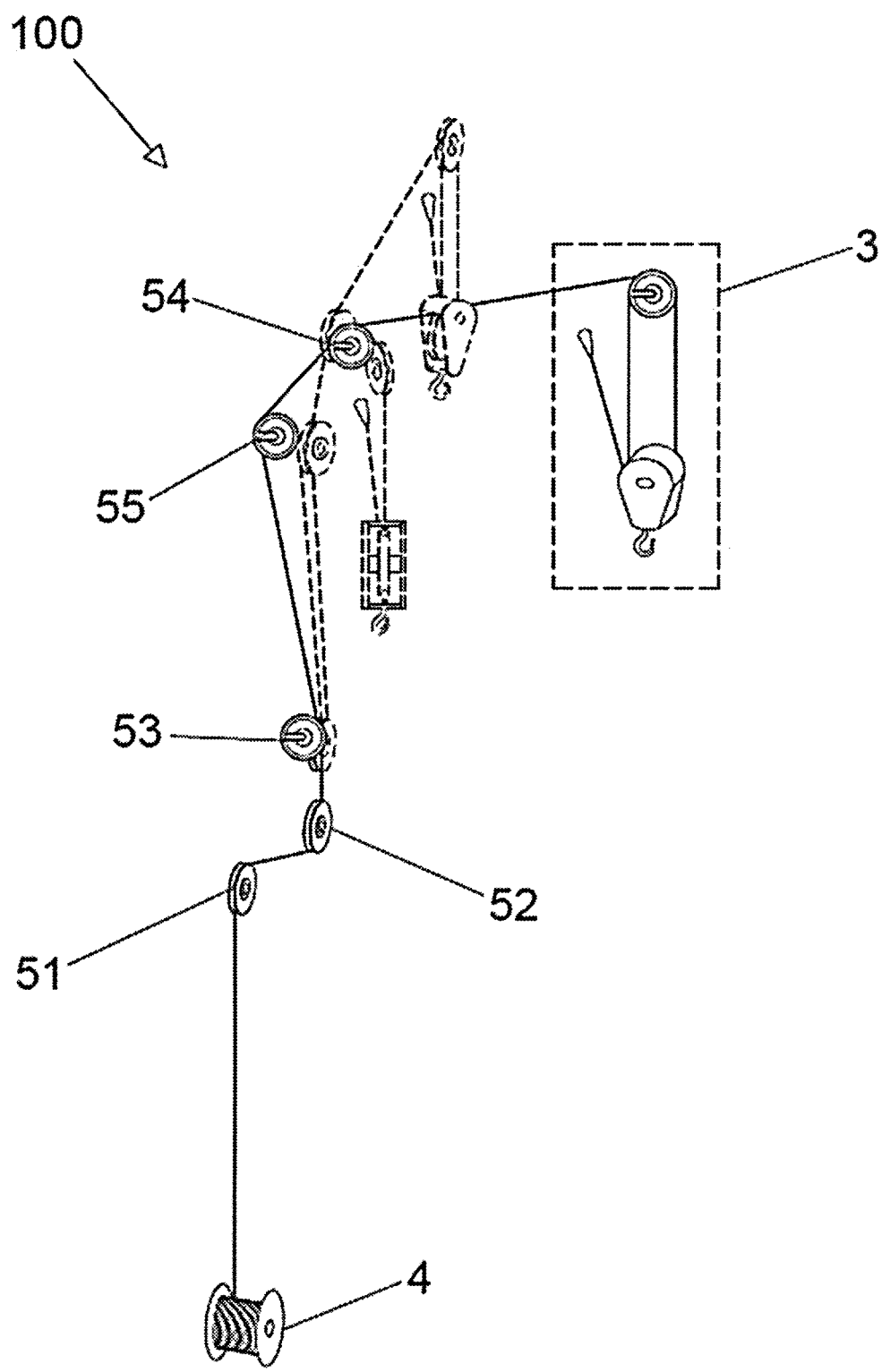

The single wire 6 comprises a wire section 60 between the pulley 52 of the first part and the pulley 53 of the second part, referenced in FIG. 3, connecting the fixed part 1 of the crane 100 to the pivoting part 2 of said crane 100. The pulleys 52 and 53 are arranged in the fixed part 1 and in the pivoting part 2, respectively, such that the wire section 60 goes through the center of rotation of the pivoting part 2 with respect to the fixed part 1. As a result of this configuration, a single wire can be used for lifting and lowering heavy elements in a simple manner, such that the number of pulleys can be reduced and complications derived from using two wires are prevented. Furthermore, the position of the winch 4 is fixed whereas the crane 100 is movable and can rotate about itself. In such situations, pulleys and bearings specific for such purpose are generally used to offer this rotational freedom, and as a result of the proposed configuration of the crane 100, the use of said specific pulleys and bearings can be avoided by passing the wire section 60 through the center of rotation of the pivoting part 2 with respect to the fixed part 1 (through the center of the movable crane 100), which further simplifies the design of the crane 100. The wire section 60 is the section of the single wire 6 arranged between both pulleys 52 and 53 at any given time.

The wire section extends in a substantially vertical manner between the pulleys 52 and 53, such that the axes of both pulleys are arranged on one and the same vertical plane.

Figure 5:
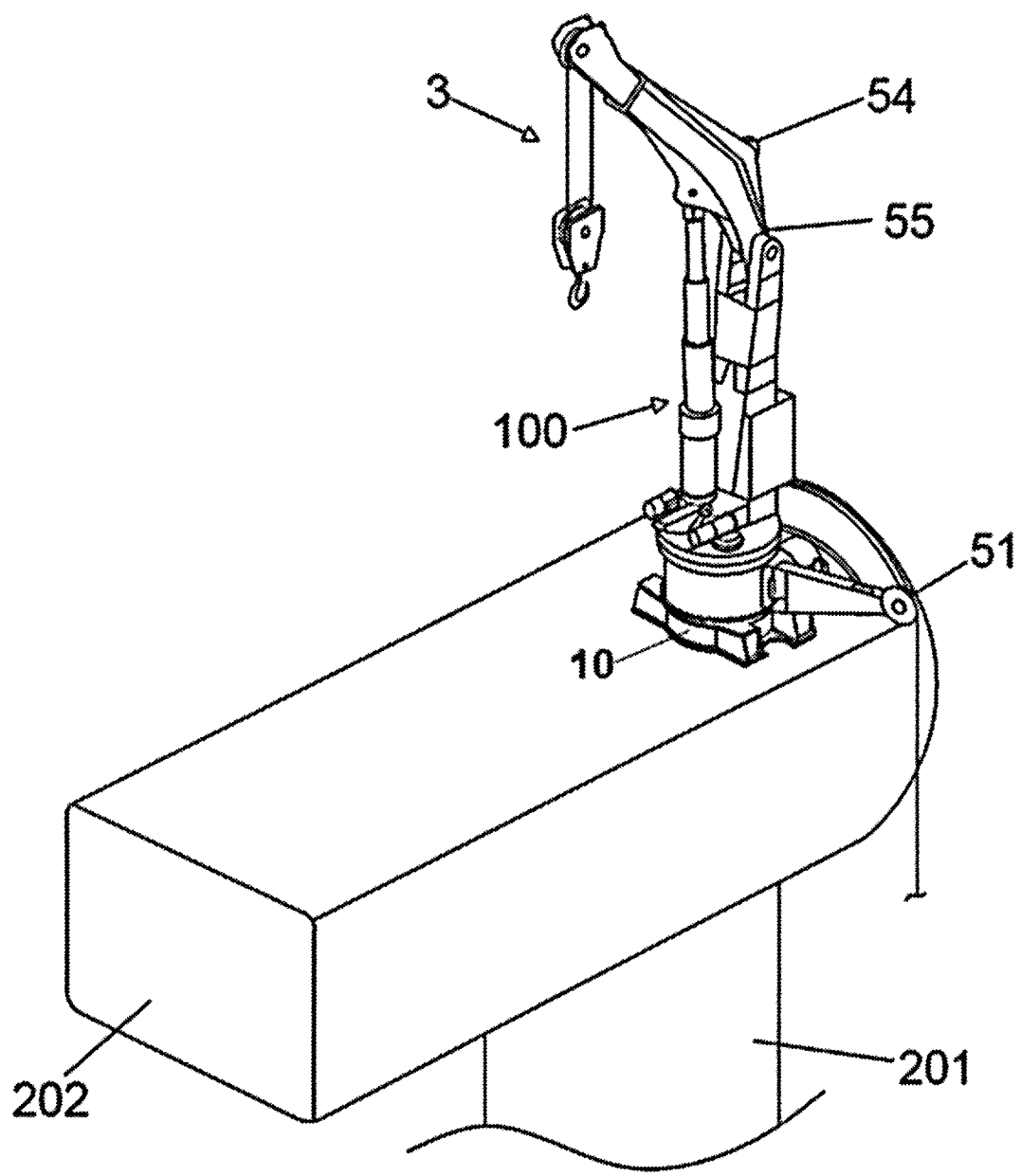
FIG. 5 shows the crane of FIG. 1a, fixed to the nacelle of the wind turbine, in operating conditions and without any of the elements of the nacelle.

The fixed part 1 comprises a base 10 which is fixed to the wind turbine 200, preferably to the nacelle 202 of said wind turbine 200 as shown in the example of FIG. 5, and serves as a support for the crane 100, and a crane body 11 arranged on the base 10. The pivoting part 2 of the crane 100 is attached with rotational freedom to the crane body 11, and the crane body 11 preferably comprises therein a rotation mechanism not depicted in the drawings to cause the rotation of the pivoting part 2 with respect to the fixed part 1. The operation of the rotation mechanism is not described in detail, and any mechanism known in the prior art, for example, can be used for this purpose. The crane body is preferably cylindrical, and its axis is the axis of rotation with respect to which the pivoting part 2 rotates, actuated by the rotation mechanism.

The wiring guide preferably comprises at least two pulleys 51 and 52 in the first part (the part of the wiring guide attached to the fixed part 1 of the crane 100). A first pulley 51 is arranged above the winch 4 such that the single wire 6 extends substantially vertical from said winch 4 to said first pulley 51, above the base 10, and outside the crane body 11. The crane 100 comprises a static arm 9 which is fixed to the crane body 11 at one end and supports the first pulley 51 at the other end, said pulley 51 being attached to said other end of said static arm 9. A second pulley 52 of the wiring guide is arranged inside the crane body 11, said second pulley 52 being the pulley from which the wire section 60 of the single wire 6 going through the center of rotation of the pivoting part 2 with respect to the fixed part 1 departs towards said pivoting part 2. The second pulley 52 is therefore substantially centered inside the crane body 11, i.e., arranged substantially on the central axis inside the crane body 11, allowing the wire section 60 to thus go through said center of rotation. The crane body 11 has a window not depicted in the drawings to allow the passage of the single wire 6 from the first pulley 51 to the second pulley 52 and vice versa.

Each pulley 51 and 52 comprises an axis with respect to which it can rotate, and said axes are preferably horizontal and parallel to one another. The single wire 6 therefore extends between both pulleys such that it is at a greater height at the outlet of the first pulley 51 towards the second pulley 52, than at the inlet of said second pulley 52 from said first pulley 51, and allows withstanding greater stress. Both axes are furthermore on one and the same horizontal plane, which makes the travel of the single wire 6 from one pulley to another easier and maintains tolerance to high stress.

The pivoting part 2 comprises a platform 22 attached to the rotation mechanism of the fixed part 1, and preferably arranged on the crane body 11, said rotation mechanism causing the rotation of said platform 22 with respect to said fixed part 1 to cause the rotation of said pivoting part 2. The pivoting part 2 comprises a vertical body 20 fixed at one end to the platform 22, such that it rotates integrally with said platform 22 with respect to the fixed part 1. The pivoting part 2 further comprises an arm 21 attached with rotational freedom to the opposite end of the vertical body 20. The arm 21 is attached with rotational freedom at one end to the vertical body 20, rotating integrally with said vertical body 20 with respect to the fixed part 1, and the load support 3 is attached to the other end of the arm 21, rotating integrally with it both with respect to the fixed part 1 and with respect to the vertical body 21. The load support 3 therefore has two degrees of freedom which gives it the flexibility required for lifting and lowering the corresponding elements to and from the required place: a first degree of freedom which corresponds with the rotation with respect to the fixed part 1 (provided by the rotation of the vertical body 20 with respect to said fixed part 1), and a second degree of freedom which corresponds with the rotation with respect to the vertical body 20 (provided by the rotation of the arm 21 with respect to said vertical body 20).

The crane 100 preferably comprises a hydraulic cylinder 8 with a rod 8*a* to cause the rotation of the arm 21 with respect to the vertical body 20. A base 8*b* of the cylinder 8 is fixed to the platform 22, such that said cylinder 8 rotates integrally with said pivoting part 2, and one end of the rod 8*a* is attached to the arm 21, such that when the rod 8*a* extends or contracts, the movement of said arm 21 integral with the movement of said rod 8*a* is caused, said movement of the arm 21 being the rotation thereof with respect to the vertical body 20.

As mentioned, the wiring guide comprises at least one pulley 53 in the pivoting part 2 of the crane 100, the wire section 60 between said pulley 53 and the pulley 52 comprised by said wiring guide being in the fixed part 1. The pulley 53 is fixed to the vertical body 21 of the pivoting part 2, with rotational freedom with respect to the actual axis thereof, and the wiring guide 5 comprises at least one additional pulley 54 in the arm 21, such that the single wire 6 is guided in the two elements of the crane which are movable with respect to the fixed part 1 (vertical body 20 and arm 21).

The wiring guide preferably comprises an intermediate pulley 55 in its second part (the part attached to the pivoting part 2 of the crane 100), arranged between pulleys 53 and 54 in the trajectory of the single wire 6. The arrangement of the intermediate pulley 55 is such that its axis is the axis of rotation with respect to which the arm 21 rotates with respect the vertical body 20. The intermediate pulley 55 therefore serves as a transition for the single wire 6 as it goes from a first element movable with respect to the fixed part (vertical body 20) to a second element movable with respect to said fixed part (arm 21), and allows a more comfortable rotation of said second element (arm 21) with respect to said first element (vertical body 20), while at the same time helps to support the corresponding heavy element. The intermediate pulley 55 is attached to the vertical body 20 and to the arm 21.

The vertical body 20 preferably comprises a U-shaped upper part with two opposite flanges 20*a*, and the intermediate pulley 55 is arranged inside the "U" between both flanges 20*a*. The crane 100 comprises a shaft 7 for attaching the intermediate pulley 55 to the vertical body 20, which goes through the center of the intermediate pulley 55, said intermediate pulley 55 thereby being positioned in said arrangement, and which is fixed to both flanges 20*a*. The intermediate pulley 55 can rotate with respect to said shaft 7, but does not move longitudinally.

The wiring guide therefore comprises at least three pulleys 53, 54 and 55 in its second part which is attached to the pivoting part 2 of the crane 100, with rotational freedom with respect to the respective axes thereof. Said axes are furthermore parallel to one another, which makes the travel of the single wire 6 from one pulley to another easier.

The trajectory which the single wire 6 follows between the winch 4 and the load support 3 is therefore defined as follows: the single wire 6 goes from the winch 4 to the pulley 51, from said pulley 51 to the pulley 52, from said pulley 52 to the pulley 53, passing from the fixed part 1 of the crane 100 to the pivoting part 2, from said pulley 53 to the intermediate pulley 55, from said intermediate pulley 55 to the pulley 54, and from said pulley 54 to the load support 3. The load support 3 can comprise at least one additional pulley 31 in addition to a hook for holding the corresponding heavy element (with the help of a sling or another equivalent element, for example).

The invention claimed is:

1. A crane of a wind turbine for lifting and lowering heavy elements of said wind turbine, said wind turbine comprising a tower which is fixed to the ground and a nacelle fixed to an upper part of the tower, the crane comprising:
    a fixed part,
    a pivoting part which is arranged on the fixed part and attached with rotational freedom to the fixed part,
    a load support for supporting the heavy element and attached to the pivoting part,
    a winch,
    a wiring system between the winch and the load support, and
    a wiring guide for guiding the wiring system from the winch to the load support through the fixed part and the pivoting part,
    wherein:
    the wiring system comprises a single wire, the wiring guide comprising at least one pulley attached to the fixed part of the crane for guiding said single wire through the fixed part, and at least one pulley attached to the pivoting part of the crane for guiding the single wire through the pivoting part, and
    the single wire comprising a wire section between the at least one pulley of the fixed part of the crane and the at least one pulley of the pivoting part of the crane, connecting the fixed part to the pivoting part, said at least one pulley of the fixed part and the pivoting part of the crane being arranged such that the wire section goes through the center of rotation of the pivoting part with respect to the fixed part.

2. The crane of a wind turbine according to claim 1, wherein the wire section of the single wire arranged between the at least one pulley of the wiring guide attached to the fixed part and the at least one pulley of the wiring guide attached to the pivoting part extends vertically.

3. The crane of a wind turbine according to claim 1, wherein the fixed part comprises a base which is fixed to the wind turbine and a crane body arranged on the base, the pivoting part of the crane being attached with rotational freedom to the crane body and the crane body comprising a rotation mechanism to cause the rotation of the pivoting part with respect to the fixed part, the wiring guide comprising two pulleys attached to the fixed part of the crane, a first pulley being arranged above the winch and the base and outside the crane body, such that the single wire extends substantially vertical from said winch to said first pulley, and a second pulley being arranged inside the crane body, the wire section of the single wire going through the center of rotation of the pivoting part with respect to the fixed part departing from said second pulley in a substantially vertical manner.

4. The crane of a wind turbine according to claim 3, wherein the second pulley of the wiring guide attached to the fixed part of the crane is arranged substantially on a central axis inside the crane body.

5. The crane of a wind turbine according to claim 3, wherein the wire section of the single wire going through the center of rotation of the pivoting part with respect to the fixed part extends from the second pulley of the wiring guide attached to the fixed part of the crane to the at least one pulley of said wiring guide attached to the pivoting part of said crane.

6. The crane of a wind turbine according to claim 3, wherein the axes of the first and second pulleys of the wiring guide attached to the fixed part of the crane are horizontal and parallel to one another, both axes being on one and the same horizontal plane.

7. The crane of a wind turbine according to claim 1, wherein the pivoting part comprises a platform attached to the rotation mechanism of the fixed part, said rotation mechanism causing the rotation of said platform with respect to said fixed part, a vertical body fixed to the platform at a lower end, and an arm attached to an upper end of the vertical body, opposite the lower end, with rotational freedom with respect to said vertical arm, the wiring guide comprising the at least one pulley in the vertical body and a third pulley in the arm for guiding the single wire through the pivoting part of the crane.

8. The crane of a wind turbine according to claim 7, wherein the wiring guide comprises an intermediate pulley in the trajectory of the single wire arranged between the at least one pulley of the vertical body and the third pulley of the arm, and attached to said vertical body and said arm, the axis of said intermediate pulley being the axis of rotation of the arm with respect to the vertical body.

9. The crane of a wind turbine according to claim 8, wherein the vertical body comprises a U-shaped upper end with two opposing flanges the intermediate pulley being arranged inside the "U" between both flanges and said crane comprising a shaft for attaching the intermediate pulley to the vertical body and to the arm, which goes through the center of the intermediate pulley, which is concentric to the axis of said intermediate pulley and which is fixed to both flanges.

10. The crane of a wind turbine according to claim 8, wherein the axes of the at least one, third, and intermediate pulleys of the wiring guide attached to the pivoting part of the crane are parallel.

11. A wind turbine, comprising a tower which is fixed to the ground and a nacelle fixed to an upper part of the tower, wherein said wind turbine comprises a crane according to claim 1.

12. The wind turbine according to claim 11, wherein said crane is fixed to the nacelle.

* * * * *